United States Patent
Kudou et al.

(10) Patent No.: US 7,160,569 B2
(45) Date of Patent: Jan. 9, 2007

(54) ACIDIC OIL-IN-WATER TYPE EMULSIFIED COMPOSITIONS

(75) Inventors: Naoto Kudou, Tokyo (JP); Yoshinobu Nakajima, Tokyo (JP); Makoto Satou, Tokyo (JP); Masakatsu Sugiura, Kamisu-machi (JP); Hiroaki Yamaguchi, Kamisu (JP); Tsukasa Miyatani, Tokyo (JP)

(73) Assignee: Kao Corporation, Tokyo (JP)

( * ) Notice: Subject to any disclaimer, the term of this patent is extended or adjusted under 35 U.S.C. 154(b) by 393 days.

(21) Appl. No.: 10/608,030

(22) Filed: Jun. 30, 2003

(65) Prior Publication Data
US 2004/0037940 A1   Feb. 26, 2004

(30) Foreign Application Priority Data
Jul. 1, 2002   (JP) .............................. 2002-192538
Nov. 6, 2002   (JP) .............................. 2002-322986

(51) Int. Cl.
*A23D 7/00*   (2006.01)

(52) U.S. Cl. ........................ 426/605; 426/602; 426/613

(58) Field of Classification Search ...................... None
See application file for complete search history.

(56) References Cited

U.S. PATENT DOCUMENTS

| | | | | |
|---|---|---|---|---|
| 4,034,124 A | * | 7/1977 | van Dam | 426/602 |
| 4,119,564 A | * | 10/1978 | Van Dam | 516/56 |
| 5,160,759 A | * | 11/1992 | Nomura et al. | 426/602 |
| 5,690,981 A | * | 11/1997 | Watanabe et al. | 426/531 |
| 5,958,498 A | * | 9/1999 | Trueck et al. | 426/605 |
| 6,635,777 B1 | * | 10/2003 | Kawai et al. | 554/227 |

FOREIGN PATENT DOCUMENTS

| | | | |
|---|---|---|---|
| EP | 0 425 958 | | 5/1991 |
| EP | 0425958 | * | 5/1991 |
| EP | 1 214 886 | | 6/2002 |
| JP | 4300828 | | 10/1992 |
| JP | 3008431 | | 1/2001 |
| JP | 2001000138 | | 1/2001 |
| JP | 2002-171931 | * | 6/2002 |
| WO | WO 00/78162 | | 12/2000 |
| WO | WO 02/39833 | | 5/2002 |

OTHER PUBLICATIONS

Patent Abstracts of Japan, JP 02-291228, Dec. 3, 1990.
U.S. Appl. No. 10/761,358, filed Jan. 22, 2004, Koike, et al.
U.S. Appl. No. 10/608,030, filed Jun. 30, 2003, Kudou, et al.
U.S. Appl. No. 10/857,020, filed Jun. 1, 2004, Moriwaki, et al.
Japanese Patent Office Official Action dated Dec. 6, 2005 with English language translation.

* cited by examiner

*Primary Examiner*—Carolyn Paden
(74) *Attorney, Agent, or Firm*—Oblon, Spivak, McClelland, Maier & Neustadt, P.C.

(57) ABSTRACT

Provided is an acidic oil-in-water type emulsified composition, containing an oil or fat having a diglyceride content of 30 wt. % or greater an egg yolk, and a water soluble soybean polysaccharide.

The acidic oil-in-water type emulsified composition of the present invention is excellent in taste and appearance stability, has resistance against pressure-induced shear stress which occurs upon preparation or use, shows less changes in physical properties, for example, viscosity reduction can be suppressed, and is free from appearance change such as oil/water separation. Thus, it has a stable quality.

25 Claims, No Drawings

ACIDIC OIL-IN-WATER TYPE EMULSIFIED COMPOSITIONS

TECHNICAL FIELD

The present invention relates to acidic oil-in-water type emulsified compositions particularly suited for use in mayonnaises and dressings.

BACKGROUND OF THE INVENTION

In recent years, it has become clear that diglycerides have an anti-obesity action, weight-gain suppressing action and the like (Japanese Patent Laid-Open No. Hei 4-300828). There has been an attempt to incorporate them in various foods. It is reported that edible oil-in-water type emulsified compositions having a rich fatty savor and good taste are available even at a lowered fat content by using, as an oil phase, a glyceride mixture having a high diglyceride content (Japanese Patent Laid-Open No. Hei 3-8431).

It has however been revealed that acidic oil-in-water type emulsified compositions such as mayonnaise obtained by emulsifying an oil phase having a high diglyceride content with an egg yolk causes problems, after storage, such as oil/water separation and deterioration in appearance such as loss of gloss. With a view to overcoming these problems, a technique of adjusting a lysophospholipid content in an acidic oil-in-water type emulsified composition is reported (Japanese Patent Laid-Open No. 2001-138).

Another problem upon preparation of acidic oil-in-water type emulsified compositions such as mayonnaise is that when they are transferred from an emulsifying machine to a filling machine via a pipe or they are filled in a container, shear occurs by pressure, causing a change in the physical properties of the acidic oil-in-water type emulsified compositions such as viscosity. Whenever acidic oil-in-water type emulsified compositions, for example, mayonnaise filled in a plastic mayonnaise bottle is used, a pushing pressure is applied to the bottle, which is prone to cause emulsion breakage, water/oil separation and the like, thus deteriorating their quality. Acidic oil-in-water type emulsified compositions are therefore desired to have stability against pressure-induced shear stress which occurs upon preparation, filling or actual use.

The above-described technique of improving appearance by adjusting a lysophospholipid content is effective when the composition is stored statically, but its effect is not sufficient in the presence of pressure-induced shear stress.

SUMMARY OF THE INVENTION

In the present invention, there is thus provided an acidic oil-in-water type emulsified composition comprising the following components (A), (B) and (C):

(A) an oil or fat having a diglyceride content of 30 wt. % or greater, (B) an egg yolk, the egg yolk containing a lysophospholipid and a phospholipid and (C) a water soluble soybean polysaccharide.

DETAILED DESCRIPTION

All publications cited herein are hereby incorporated by reference. The present invention relates to an acidic oil-in-water type emulsified composition having a high diglyceride content while having excellent resistance against a pressure-induced shear stress which is applied upon its preparation or actual use, being stable with less changes in physical properties such as viscosity reduction, and not causing a change in appearance such as water/oil separation.

The present inventors have found that when a water soluble soybean polysaccharide is added to an acidic oil-in-water type emulsified composition containing an oil phase having a high diglyceride content, and an egg yolk, the resulting composition has good appearance without controlling the lysophospholipid content, is markedly stable against pressure-induced shear stress applied to the composition during transfer via a pipe or filling work upon preparation or squeezing upon actual use, and does not cause a quality deterioration.

It is preferred to use a low melting point oil or fat for the acidic oil-in-water type emulsified compositions such as mayonnaises and dressings in order to avoid crystallization or solidification when stored at low temperatures, for example, in a refrigerator. The diglycerides to be used in the present invention preferably have a low melting point. Described specifically, their constituent fatty acid residues have preferably 8 to 24 carbon atoms, especially preferably 16 to 22 carbon atoms. The amount of unsaturated fatty acid residues is preferably 55 wt. % (which will hereinafter be described "%" simply) or greater, more preferably from 70 to 100%, even more preferably from 90 to 100%, still even more preferably from 93 to 98%, each based on the total amount of all the fatty acid residues. The diglycerides are available by any known method such as transesterification between a vegetable oil or animal oil and glycerin, or esterification between a fatty acid derived from the above-described oil or fat and glycerin. They may be reacted in accordance with either one of a chemical reaction using an alkali catalyst or the like, or biochemical reaction using an oil/fat hydrolase such as lipase.

The diglyceride content in the oil or fat (component (A)) of the acidic oil-in-water type emulsified composition of the present invention is 30% or greater, preferably from 35 to 100%, more preferably from 50 to 99.9%, even more preferably from 70 to 95% from the viewpoints of effectiveness of the composition as a lipid metabolism improving food or a body fat accumulation suppressing food, and industrial productivity. In addition to the diglycerides, triglycerides, monoglycerides, free fatty acids and the like can also be incorporated in the oil or fat.

The content of the monoglycerides in the oil or fat is preferably 5% or less, more preferably from 0 to 2%, even more preferably from 0.1 to 1.5% in view of its emulsifying property, taste and industrial productivity.

The content of the free fatty acids (salts) in the oil phase is preferably 1% or less, more preferably from 0 to 0.5%, even more preferably from 0.05 to 0.2% in view of its emulsifying property, taste and industrial productivity.

The content of the triglycerides in the oil phase is preferably 70% or less, more preferably from 0 to 65%, even more preferably from 0.1 to 50%, still even more preferably from 3.3% to 29.85% in view of its emulsifying property, taste, physiological effect and industrial productivity.

The egg yolk (component (B)) used in the present invention may take any form such as raw, frozen, powdered, salted, and sugar-added yolks. It may be added as a whole egg containing albumen. The content of the yolk in the composition is preferably from 5 to 20% in terms of a liquid yolk, more preferably from 7 to 17%, even more preferably from 8 to 15%, and still even more preferably from 10 to 15% from the viewpoint of improving the taste of the resulting composition.

As the egg yolk, use of an enzyme-treated egg yolk which will be described later is preferred.

The water soluble soybean polysaccharide (component (C)) used in the present invention is a polysaccharide made of rhamnose, fucose, arabinose, xylose, galactose, glucose, uronic acid, including mixtures thereof. The polysaccharide (component (C)) used in the invention is prepared, for example, by subjecting "bean-curd refuse" which remains after making bean curd (tofu), a residue remaining after extraction of protein from soybean or the like material to alkali treatment or hydrolysis treatment. Examples of the preparation process include a process of extracting a residue (bean curd refuse) remaining after separation of soybean milk from soybean with an aqueous alkaline solution containing a hydrophilic organic solvent, thereby collecting a solid matter (Japanese Patent Publication No. Sho 60-31841), a process of extracting a soy bean husk with warm water or an aqueous alkali solution (Japanese Patent Laid-Open No. Sho 60-146828), a process of finely cutting vegetable fibers of soybean, hydrolyzing protein in the resulting fibers and then fractionating a water-soluble polysaccharide (Japanese Patent Laid-Open No. Hei 3-067595), and a process of preparing a water soluble polysaccharide by hydrolyzing protein-containing water-soluble food fibers of soybean under acidic conditions near an isoelectric point of the protein (Japanese Patent Laid-Open No. Hei 3-236759).

Examples of commercially available ones include "Soya Five" "Soya Up" (each, product of Fuji Oil Co., Ltd.), and "SM-700" (product of San-Ei Gen FFI).

The content of the water soluble soybean polysaccharide in the acidic oil-in-water type emulsified composition preferably ranges from 0.01 to 10%, more preferably from 0.02 to 5%, even more preferably from 0.05 to 3%, still even more preferably from 0.1 to 1% from the viewpoints of stability against shear, appearance and texture.

In the acidic oil-in-water type emulsified composition of the present invention, the weight percentage of lysophospholipid (which will hereinafter be called "lyso percentage") in the total phospholipid is preferably 15% or greater, more preferably from 25 to 75%, even more preferably from 29 to 65%, in terms of the phosphorus amount, from the viewpoints of taste and appearance. The lysophospholipid which is partially or entirely derived from an egg yolk or soybean is preferred, with that derived from an egg yolk being particularly preferred.

The lysophospholipid is preferably derived partially or entirely from an enzyme-treated egg yolk. As the enzyme used for the treatment of egg yolk, esterases, lipases, phospholipases, and mixtures thereof are preferred, of which lipases and phospholipases are more preferred and phospholipases are particularly preferred. As the phospholipases, phospholipase A, more specifically, phospholipase $A_1$ and/or $A_2$ is more preferred.

When the egg yolk is composed only of an enzyme-treated yolk, conditions for the enzymatic treatment may be determined as needed to give a lyso percentage of 15% or greater. Described specifically, when the enzymatic activity is 10000 IU/mL, the enzyme is preferably added to the yolk in an amount of from 0.0001 to 0.1%, particularly preferably from 0.001 to 0.01%. The reaction temperature is preferably 20 to 60° C., with 30 to 55° C. being particularly preferred, while the reaction time is preferably 1 to 30 hours, with 5 to 25 hours being particularly preferred. When the egg yolk is composed partially of an enzyme-treated egg yolk, on the other hand, the conditions for the enzymatic treatment may be selected so that the total lyso percentage of the yolk free of enzymatic treatment and the enzyme treated yolk falls within the above-described range. Such enzymatic treatment is preferably carried out prior to emulsification of the mixture of raw materials.

In the acidic oil-in-water type emulsified composition of the present invention, a phytosterol, preferably one having a blood cholesterol lowering action may be incorporated. Although not wanting to be limited by theory, it is believed that the combined use of the diglycerides and phytosterol heightens blood cholesterol lowering effects synergistically, making it possible to heighten usefulness of the resulting composition as a lipid metabolism improving food. Examples of phytosterol include α-sitosterol, β-sitosterol, stigmasterol, ergosterol and campesterol. Fatty acid esters, ferulic acid esters or glycosides, of the above mentioned phytosterols may be employed. In the present invention, one or more of them can be used as the phytosterol. Phytosterol, phytosterol ester or a mixture thereof is particularly preferred. The phytosterol content of the acidic oil-in-water type emulsified composition preferably ranges from 1.2 to 10%, more preferably from 2 to 5%.

The oil phase of the acidic oil-in-water type emulsified composition of the invention is composed of the diglyceride-containing oil or fat (A). It may further contain a phytosterol and/or the other oily components if necessary.

In the acidic oil-in-water type emulsified composition of the present invention, the aqueous phase can be water; edible vinegars such as rice vinegar, sake lees vinegar, apple vinegar, grape vinegar, grain vinegar and synthetic vinegar; salt; seasonings such as sodium glutamate; sugars such as sugar and thick malt syrup; taste corrigent such as sake and Japanese sweet rice wine for cooking; various vitamins; organic acids such as citric acid and salts thereof; spices; squeezed vegetable or fruit juices such as lemon juice; polysaccharide gums such as, xanthan gum, gellan gum, guar gum, tamarind gum, carrageenan, pectin and tragacanth gum; starches such as potato starch, hydrolysate thereof, and modified starches thereof; synthetic emulsifiers such as sucrose fatty acid esters, sorbitan fatty acid esters, polyglycerol fatty acid esters, and polysorbate; natural emulsifiers, for example, protein emulsifiers such as soybean protein, milk protein, wheat protein, and separated or decomposed products of these proteins, and lecithin and enzymatically decomposed products thereof; milk products such as milk; and various phosphate salts. In the present invention, they may be added as needed, depending on the physical properties, such as viscosity, of the intended composition.

The aqueous phase has preferably a pH of from 2 to 6, especially preferably from 3 to 5, from the viewpoints of taste and storage stability. For pH adjustment of the aqueous phase, the above-described acidifiers such as edible vinegars, organic acids or salts thereof, and juices can be used.

The weight ratio of the oil phase/aqueous phase preferably ranges from 10/90 to 80/20, of which a range of from 20/80 to 75/25 is more preferred and a range of from 35/65 to 70/30 is especially preferred.

Examples of the acidic oil-in-water type emulsified composition of the present invention include dressing, semi-solid dressing, emulsified dressing, mayonnaise, salad dressing, and French dressing as defined by Japanese Agricultural Standards (JAS). Not only them, but also products called mayonnaise, mayonnaise-like food, dressing and dressing-like food are included as compositions of the present invention.

The acidic oil-in-water type emulsified compositions of the present invention can be prepared, for example, in the following process. First, an oil phase is prepared by mixing oil components such as the diglyceride-containing oil or fat (A) and phytosterol. An aqueous phase is, on the other hand, prepared by mixing the egg yolk (B), water soluble soybean polysaccharide (C) and optionally the other water soluble raw materials. The oil phase is added to the aqueous phase, followed by preliminary emulsification if necessary to homogenize the mixture, whereby an acidic oil-in-water type emulsified composition is available. Examples of the homogenizers usable here include high-pressure homogenizers such as Manton Gaulin and microfluidizer, ultrasonic emulsifiers, colloid mills, AGI homomixer and Milder.

In the invention, it has been found as a result of various investigations on the improvement in resistance against a pressure-induced shear stress applied upon preparation or actual use that by subjecting the yolk-containing aqueous phase to mechanical treatment prior to addition thereto of the oil phase upon preparation of the acidic oil-in-water emulsified composition, thereby increasing the viscosity of the aqueous phase to exceed a predetermined range or lowering the solubility of the yolk protein to a predetermined range, the resulting acidic oil-in-water type emulsion has an increased viscosity and moreover, improved resistance against pressure-induced shear stress.

Accordingly, it is preferred to subject the aqueous phase containing the egg yolk (B) to mechanical treatment to increase its viscosity by at least 50% or to reduce the solubility of the yolk protein by 5 to 60%, each compared with that before treatment, and add the oil phase containing component (A) to the resulting aqueous phase, thereby preparing an acidic oil-in-water type emulsion. It is preferred to add the water soluble soybean polysaccharide (component (C)) with the oil phase in the view of workability.

Examples of "mechanical treatment" includes stirring, shearing, mixing, homogenization and kneading, of which stirring, particularly vigorous stirring, is preferred in view of convenience. The stirring intensity is indicated by shearing energy. A range of from 35000 to 2000000 m/s, especially a range of from 70000 to 1000000 m/s is preferred. The term "shearing energy" as used herein is defined as a product of "amount of aqueous phase" circulated by stirring per charged amount (=the number of times of the aqueous phase circulated in a tank by stirring, which will hereinafter be called "circulated frequency") and "the outermost peripheral velocity of an agitating element" ("Practice of New Stirring Technology", published by Gijutsu Joho Kyokai (1989))

When productivity is taken into consideration, the tank used for stirring is not always washed prior to use, but raw materials of the subsequent batch such as yolk may be added while the emulsion is not removed completely from the tank.

For the purpose of improving resistance against pressure-induced shear stress, attaining sufficient viscosity and long-term emulsion stabilizing effect, it is preferred to increase the viscosity by 50% or greater or to lower the solubility of yolk protein by 5 to 60% by the above-described treatment, each compared with that before the treatment. The viscosity increase by 100 to 500%, especially by 150 to 300% is preferred, while a preferred reduction ratio of the solubility of the yolk protein is 10 to 30%.

The mechanical treatment is particularly desired, because it can simultaneously attain the above-described viscosity increase and reduction in the solubility of the yolk protein and it does not impair the taste. Accordingly, physical properties (e,g, resistance against a pressure-induced shear stress, viscosity, long-term emulsion stability and taste) of the acid oil-in-water type emulsion can be controlled by properly adjusting the mechanical treatment conditions. As the mechanical treatment, vigorous stirring, particularly vigorous stirring in a stirring tank equipped with an agitation element is preferred. The turning direction of the agitation element is not limited. For the mechanical treatment, high pressure homogenizers such as Manton Gaulin and microfluidizer, ultrasonic emulsifiers, colloid mills, line mills, homomixers, AGI homomixer and Milder can also be used. Shear stress upon mechanical treatment may cause heat evolution.

The mechanical treatment may be applied only to the egg yolk component. In the case where water must be incorporated, however, addition of water after mechanical treatment of the egg yolk component may partially collapse the structure which has already been constructed and lowers an viscosity improving effect. It is therefore preferred to carry out the mechanical treatment after mixing solid seasonings such as salt, sugar and sodium glutamate dispersed and dissolved in water, and component (B). Addition of the oil phase containing component (A) preferably follows the mechanical treatment.

When industrial production of the composition is conducted sanitarily, the acidic oil-in-water type emulsified composition obtained in the above-described process is fed to a filling machine via a pipe and then filled in a container. The acidic oil-in-water type emulsified composition of the invention preferably has a viscosity of from about 50 kPa·s to 500 kPa·s and a volume-average emulsion particle size of from 0.1 μm to 10 μm. Upon feeding via pipes, or filling in the container, a pressure-induced shear stress tends to occur because the emulsion has a high viscosity. Pressure-induced shear stress upon feeding or filling is presumed to be 0.1 kPa to 10 kPa. The acidic oil-in-water type emulsion of the invention is particularly effective against pressure-induced shear stress upon industrial production.

The acidic oil-in-water type emulsion thus prepared is filled in a container and it is usable as an emulsified food in a package as mayonnaise. Any container is usable insofar as it is conventionally used for acidic oil-in-water type emulsified foods such as mayonnaise and dressing. In particular, flexible containers which are easier to use than container, for example, plastic tubular containers such as a bottle are preferred. Examples of the plastic container include those obtained by mixing one or more of thermoplastic resins such as polyethylene, polypropylene, ethylenic copolymers of vinyl acetate, ethylene•vinyl alcohol copolymer and polyethylene terephthalate and blown molding the resulting mixture; and those obtained by stacking two or more layers made of such a thermoplastic resin and then blow molding the stack.

When the composition is filled in a flexible container, the shear stress by squeezing is applied in repetition until the whole composition is consumed. The acidic oil-in-water type emulsion of the invention is also effective against such shear stress.

EXAMPLES

The following examples further describe and demonstrate embodiments of the present invention. The examples are given solely for the purpose of illustration and are not to be construed as limitations of the present invention.

Referential Examples 1 and 2

After 750 g of an egg yolk solution having a salt concentration of 10%, 150 g of water and 15 g of salt were mixed and the mixture was preheated sufficiently at the reaction temperature, phospholipase $A_2$ was added thereto in an amount as shown in Table 1, whereby each of the enzyme-treated egg yolks (Referential Examples 1 and 2) was obtained. The reaction time, reaction temperature and lyso percentage are shown in Table 1. The lyso percentage was calculated in the following manner. First, the reaction mixture was extracted in repetition with a (3:1, v/v) chloroform/methanol mixed solvent to obtain the whole lipid in the reaction mixture. The lipid mixture thus obtained was subjected to thin layer chromatography. By two-dimensional thin layer chromatography using chloroform:methanol:water (65:25:49, v/v/v) for one-dimensional developing system and butanol:acetic acid:water (60:20:20, v/v/v) for two-dimensional developing system, various phospholipids were obtained by fractionation. The phosphorus amount in the phospholipids thus collected was measured using a commercially available measuring kit (permanganate salt ashing method, "Phospholipid Test Wako", product of Wako Pure Chemicals). A lyso percentage (%) was determined from the following equation: (total phosphorus amount in lysophospholipid fractions/total phosphorus amount in phospholipid fractions)×100.

TABLE 1

|  | Lyso percentage (%) | Phospholipase $A_2$ *1 (%) | Temperature (° C.) | Time (hr) |
|---|---|---|---|---|
| Ref. Ex. 1 | 35 | 0.04 | 50 | 8 |
| Ref. Ex. 2 | 56 | 0.04 | 50 | 20 |

*1: enzymatic activity: 10,000 IU/mL

Example 1

Examples of the Present Invention: Products 1 to 5, Comparative: Products 1 to 5

The oil phase and aqueous phase, each having the composition as shown in Table 2, were prepared in a conventional manner. After the oil phase was preliminarily emulsified while stirring the aqueous phase, the mixture was homogenized using a colloid mill ("Straight Rotor", product of PUC) at 3000 r/min with a clearance set at 0.045 mm, whereby a mayonnaise having a volume average emulsion particle size of from 1.5 to 2.8 μm was prepared. The physical properties and appearance of the mayonnaise thus obtained were evaluated. The results are shown in Table 2.

Test 1 (Evaluation of Physical Properties)

The mayonnaise prepared above was filled in a pressure bottle, followed by application of a shear stress thereto under pressure of 196 kPa via a pipe having an inner diameter of 4 mm and length of 30 cm. The viscosities before and after application of shear stress were measured. Then, a viscosity reduction ratio (%) upon application of shear stress was determined in accordance with the below-described equation to evaluate physical properties.

Viscosity measuring conditions: at 20° C., by "Brookfield Viscometer Model DV-I, spindle No. 6, 2 r/min"; product of Brookfield Engineering Laboratories, for 30 seconds.

$$\text{Viscosity reduction ratio} = \frac{\text{Viscosity after application of shear-causing pressure}}{\text{Viscosity before application of shear-causing pressure}} \times 100$$

Test 2 (Evaluation of Appearance)

The mayonnaise to which the shear-causing pressure had been applied in Test 1 was filled in about 70 vol. % of a plastic tubular mayonnaise bottle (100 mL). After removing all the air, the bottle was hermetically sealed. The bottle was pushed in repetition and appearance of the emulsion after the bottle had been pushed 500 times by hand was visually observed and evaluated in accordance with the criteria described below.

Evaluation Criteria:

A: The mayonnaise has a very good appearance with smoothness and gloss, compared with the appearance before the test.

B: Although a slight roughening of the texture exists, the mayonnaise has a good appearance without no oil/water separation.

C: Oil/water separation is observed in places and therefore, the mayonnaise has a poor appearance.

TABLE 2

|  |  | % | | | | | | | | | |
|---|---|---|---|---|---|---|---|---|---|---|---|
|  |  | Example invention product 1 | Comparative product 1 | Example Invention product 2 | Comparative product 2 | Example Invention product 3 | Comparative product 3 | Example Invention product 4 | Comparative product 4 | Example Invention product 5 | Comparative product 5 |
| Aqueous phase | 10% Salted yolk | 15.1 | 15.1 |  |  |  |  |  |  |  |  |
|  | Yolk of Ref. Ex. 1 |  |  | 18 | 18 |  |  |  |  |  |  |
|  | Yolk of Ref. Ex. 2 |  |  |  |  | 18 | 18 | 18 | 18 | 18 | 18 |
|  | Water soluble soybean polysaccharide*2 | 0.2 |  | 0.2 |  | 0.2 |  | 0.2 |  | 0.2 |  |
|  | Refined salt | 0.3 | 0.3 | 0.3 | 0.3 | 0.3 | 0.3 | 0.3 | 0.3 | 0.3 | 0.3 |
|  | Refined white sugar | 1 | 1 | 1 | 1 | 1 | 1 | 1 | 1 | 1 | 1 |
|  | Sodium glutamate | 0.5 | 0.5 | 0.5 | 0.5 | 0.5 | 0.5 | 0.5 | 0.5 | 0.5 | 0.5 |
|  | Mustard powder | 0,3 | 0.3 | 0.3 | 0.3 | 0.3 | 0.3 | 0.3 | 0.3 | 0.3 | 0.3 |
|  | 10% Brewed vinegar | 6.7 | 6.7 | 6.7 | 6.7 | 6.7 | 6.7 | 6.7 | 6.7 | 6.7 | 6.7 |
|  | Water | 8.9 | 9.1 | 6 | 6.2 | 6 | 6.2 | 6 | 6.2 | 6 | 6.2 |

TABLE 2-continued

|  |  | Example invention product 1 | Comparative product 1 | Example Invention product 2 | Comparative product 2 | Example Invention product 3 | Comparative product 3 | Example Invention product 4 | Comparative product 4 | Example Invention product 5 | Comparative product 5 |
|---|---|---|---|---|---|---|---|---|---|---|---|
| Oil phase | DG rich oil*³ | 67 | 67 | 67 | 67 | 67 | 67 | 64.3 | 64.3 | 61 | 61 |
|  | Phytosterol*⁴ |  |  |  |  |  |  | 2.7 | 2.7 | 1 | 1 |
|  | Phytosterol ester*⁵ |  |  |  |  |  |  |  |  | 5 | 5 |
| Viscosity prior to application of shear stress (Pa · s) |  | 175 | 168 | 185 | 180 | 186 | 182 | 188 | 187 | 183 | 185 |
| Viscosity after application of shear stress (Pa · s) |  | 166 | 140 | 180 | 150 | 183 | 152 | 187 | 151 | 178 | 150 |
| Reduction (%) in viscosity due to application of shear stress |  | 95 | 83 | 97 | 83 | 98 | 84 | 99 | 81 | 97 | 81 |
| Appearance after application of 500-times pushing pressure |  | B | C | A | C | A | C | A | C | A | C |

*²: "SM700" (product of San-ei Gen FFI)
*³: Prepared by enzyme reaction using 70 wt. % of winterized soybean fatty acid, 30 wt. % of rapeseed fatty acid and glycerin (Glyceride composition: MG: 0.4%, DG: 85.5%, TG 14.1%, fatty acid composition: C16:0 3.0%, C18:0 1.4%, C18:1 38.8%, C18:2 47.3%, C18:3 8.1%, C20:0 0.3%)
*⁴: "Phytosterol-F", product of Tama Seikagaku
*⁵: Prepared by esterification of phytosterol*⁴ and soybean oil fatty acid*³ (ester content: at least 95%)

It has been found that the example invention products were extremely stable with a small viscosity reduction even after application of shear-causing pressure corresponding to that upon transfer via a pipe and upon filling, and no visual change in appearance after the 500-times pushing pressure test which pressure corresponds to that upon actual use. Particularly, the resistance against pressure-induced shear stress was excellent even without controlling the lysophospholipid content (Example invention product 1). Comparative products free of a water soluble soybean polysaccharide, on the other hand, showed a drastic reduction in viscosity owing to application of shear-causing pressure, and water/oil separation occurred at the 500-times pushing pressure test. They were thus inferior in both appearance and stability against shear stress.

Example 2

An oil phase and an aqueous phase, each having the composition as shown in Table 3, were prepared in the following manner to give a total weight of 4.7 kg. First, a dispersion of purified salt, refined white sugar, sodium glutamate, mustard powder and citric acid in water (hereafter referred to as "aqueous seasoning dispersion") and an enzyme-treated egg yolk were charged in a mixer having an agitation element (element diameter: 0.144 m) (amount of the aqueous seasoning dispersion: 1.23 kg, specific gravity of the aqueous seasoning dispersion: 1100 kg/m³). The mixture was subjected to vigorous stirring at 20° C. for 15 minutes at 800 revolutions per minute. The shearing energy of the mechanical treatment under the above-described conditions was found to be 192000 (m/s) when calculated based on the definition and equation described below ("Practice of New Stirring Technology", published by Gijutsu Joho Kyokai (1989)).

Circulation frequency=circulated amount/charged amount Circulated amount (m³)=discharge rate number×element diameter (m)³×revolutions per minute (r/min)×time (min)=1×0.144³×800×15=35.8

Charged amount (m³)=Charged weight (kg)/specific gravity (kg/m³)=1.23/1100=0.00112

Outermost peripheral velocity of agitation element (m/s)= diameter of agitation element (m)×3.14×revolutions per minute (r/m)/60=0.144×3.14×800/60=6

Shearing energy (m/s)=Circulated volume/charged volume×outermost peripheral velocity of agitation element=35.8/0.00112×6=192000

(the term "discharge rate number" means a coefficient which varies depending on the shape of element, kind of liquid and temperature. In this application, it is set at 1 for clarification of the definition).

To the aqueous phase subjected to mechanical treatment was added an oil phase. Described specifically, a dispersion of soybean polysaccharide in an oil phase (diglyceride-rich oil) corresponding to 2% of the whole system was charged in the mixer to which the aqueous phase had been charged in advance, followed by uniform mixing at the above-described stirring rate for 3 minutes. At a peripheral velocity of the agitation element changed to 3 m/s, the remaining portion of the oil phase was added under stirring. A brewed vinegar was added, followed by mixing, whereby a preliminary emulsion was obtained. The emulsion was then finely emulsified (at revolutions per minute: 4200 r/min, clearance: 0.25 mm) in a colloid mill ("MZ80": product of FRYMA) to prepare mayonnaise (fine emulsion) having a volume-average emulsion particle size of 2.1 µm.

Example 3

Under similar conditions to those employed in Example 2 except that vigorous stirring of the yolk and aqueous seasoning dispersion was conducted at 40° C., followed by preliminary emulsification at 20° C., mayonnaise was prepared. The viscosity of the yolk and aqueous seasoning dispersion was measured after the temperature was adjusted to 20° C.

Comparative Example A

Under similar conditions to those employed in Example 2 except that the yolk and aqueous seasoning dispersion were stirred for 1 minute, mayonnaise was prepared. The shearing energy upon this mechanical treatment was 13000 m/s.

TABLE 3

| | |
|---|---|
| Enzyme-treated egg yolk (Ref. Ex. 2) | 18% |
| Purified salt | 0.3% |
| Refined white sugar | 1% |
| Sodium glutamate | 0.5% |
| Mustard powder | 0.3% |
| Citric acid | 0.2% |
| Water | 5.8% |
| Water soluble soybean polysaccharide *2 | 0.2% |
| Brewed vinegar (acidity: 10%) | 6.7% |
| Diglyceride-rich oil *1 | 67% |

*1 : prepared by enzyme reaction using 70 wt. % of winterized soybean fatty acid, 30 wt. % of rapeseed fatty acid and glycerin monoglycerides: 0.8%, diglycerides: 88.7%, triglycerides: 10.5% fatty acid composition (C16:0 2.6%, C18:0 0.8%, C18:1 28.4%, C18:2 59.7% C18:3 6.9%, C20:0 1.2%)
*2 : the same as that in Table 2

In each step, the viscosity and yolk protein solubility were measured as described below.

[Viscosity Measuring Method]

The viscosity was measured using a B-type viscometer (BH type, product of Tokyo Keiki).

(1) The viscosity of each of the preliminary emulsion and fine emulsion was measured under the conditions of Rotor No. 6, 2 r/min and 30 seconds.

(2) The viscosity of the dispersion, other than the preliminary emulsion and fine emulsion, to which the whole amount of the oil phase had not been added was measured under the conditions of Rotor No. 2, 20 r/min and 30 seconds. As the initial value, the value of the sample obtained after 15 seconds of vigorous stirring, that is, the point when the yolk and seasoning water were homogenized, was adopted.

The viscosity change ratio by the mechanical treatment was determined in accordance with the following equation:

Viscosity change(%)=(viscosity after mechanical treatment−initial viscosity)/(initial viscosity)×100

[Method of Measuring the Solubility of Egg Yolk Protein]

The protein of an egg yolk generally exists in the form of lipoprotein bonded to phospholipid. After the yolk is dissolved and dispersed in saline or the like and the resulting dispersion is subjected to centrifugal separation, it is separated into a supernatant portion and a precipitate portion. The former fraction is called "low-density lipoprotein", while the latter fraction is called "high-density lipoprotein". It has been said that modifying treatment such as heating usually makes proteins hydrophobic and decreases their solubility in water. In the invention, the egg yolk is preferably dissolved and dispersed in water and then, insoluble substances precipitated by centrifugal separation are removed. The supernatant is dissolved and dispersed again in a saturated saline, followed by centrifugal separation. The protein which is dissolved is regarded as an unmodified protein and its solubility is defined as egg yolk protein solubility. The modification degree of the egg yolk protein is indicated by this egg yolk protein solubility thus defined. In other words, with the progress of the modification of protein, the yolk protein solubility lowers. The following is an example of an actual measuring method.

First, 0.15 g of an enzyme-treated egg yolk or egg yolk dispersion (at the beginning of the vigorous stirring or after vigorous stirring) containing the enzyme-treated egg yolk and aqueous seasoning dispersion was accurately weighed in a sample bottle. After 15 g of distilled water (a) was weighed accurately and charged in the bottle, 1.5 g of the resulting mixture was weighed in a 2 mL centrifuging tube, followed by first centrifugal separation under the conditions of 15000 r/min and 30 minutes to remove insoluble substances. In the next place, 0.15 g of the supernatant obtained after centrifugal separation was weighed accurately in a 2 mL centrifuging tube and then, 1.5 g of saturated saline accurately weighed was added and mixed. The resulting mixture was subjected to a second centrifugal separation under the conditions of 20000 r/min and 1 hour. The centrifugal separator employed was "HIMAC centrifugal separator TYPE SCR 20BB" (product of Hitachi, Ltd.), while the rotor employed was "RPR20-3-1169. After 1 mL of the supernatant portion (unmodified protein portion) was weighed accurately in a sample bottle, its concentration was adjusted with 1 mL of distilled water (b) which had been weighed accurately. Then, a nitrogen concentration was measured by a nitrogen analyzer ("TN-05", product of Mitsubishi Chemical). A calibration curve was drawn using ammonium sulfate. A protein concentration was determined by multiplying the nitrogen concentration thus measured by 7.94, that is, a conversion factor. The enzyme-treated egg yolk used in Example 2 was however diluted with the aqueous seasoning dispersion added upon vigorous stirring and moreover, for pretreatment of nitrogen analysis, it was diluted twice with distilled water and saturated saline, respectively prior to centrifugal separation. It was diluted further with distilled water also upon nitrogen analysis. Accordingly, the protein concentration as measured by the nitrogen analyzer was a concentration diluted by these treatments. The egg yolk protein solubility was therefore determined in accordance with the following equation in which these dilution treatments were taken into consideration.

Egg yolk protein solubility [%]=((amount of the enzyme-treated egg yolk added upon stirring [%]+amount of the aqueous seasoning dispersion added upon stirring [%])/(amount of the enzyme treated egg yolk added upon stirring [%]))×((amount of enzyme-treated egg yolk dispersion [g]+amount of distilled water (a) [g])/(amount of enzyme-treated egg yolk dispersion [g]))×((amount of supernatant sample after first centrifugal separation [g]+amount of saturated saline [g])/(amount of supernatant sample after first centrifugal separation [g]))×((amount of supernatant sample after second centrifugal separation [g]+amount of distilled water (b) [g])/(amount of supernatant sample after second centrifugal separation [g]))×(conversion factor: 7.94)×(nitrogen concentration [%]).

As the initial egg yolk protein solubility, the value obtained upon sampling 15 seconds of vigorous after stirring, that is, the time when the egg yolk and seasoning dispersion were homogenized was employed.

A reduction ratio of the egg yolk protein solubility after mechanical treatment to that before mechanical treatment was determined by the following equation:

The reduction ratio (%) of egg yolk protein solubility= (initial egg yolk protein solubility−egg yolk protein solubility after mechanical treatment)/(initial egg yolk protein solubility)×100

[Evaluation Method of Stability]

After mayonnaise was stored at 20° C. for 1 month after production, 30 g of it was weighed accurately in a 50 mL centrifuging tube and centrifugal separation was conducted at 15000 r/min for 30 seconds. The oil liberated in the upper layer was weighed and an oil-off rate was calculated in accordance with the equation described below. The oil-off ratio was adopted as an evaluation index of emulsion stability of mayonnaise (fine emulsion).

Oil-off ratio (%)=amount of oil liberated by centrifugal separation (g)/(amount of mayonnaise accurately weighed in a centrifuging tug (g)×amount of oil phase (67%))×100(%)

The results are shown in Table 4. As is apparent from the table, the viscosity and emulsion stability of the mayonnaise were excellent when prior to addition and emulsification, stirring of the egg-yolk-containing aqueous phase was conducted until its viscosity increased by at least 50%, or until the egg yolk protein solubility lowered by 5 to 60%

TABLE 4

|  | Example 2 | Example 3 | Comparative Example A |
|---|---|---|---|
| Temperature upon vigorous stirring (° C.) | 20 | 40 | 20 |
| Vigorous stirring time (min) | 15 | 15 | 1 |
| Initial viscosity of vigorously stirred mixture (Pa · s) | 40 | 43 | 40 |
| Viscosity after vigorous stirring (Pa · s) | 105 | 112 | 42 |
| Viscosity change ratio by vigorous stirring (%) [1] | 163 | 160 | 5 |
| Initial egg yolk protein solubility of vigorously stirred mixture (%) | 9.2 | 9.1 | 9.2 |
| Egg yolk protein solubility after vigourous stirring (%) | 7.6 | 7.2 | 9.1 |
| Reduction ratio of egg yolk protein solubility by vigorous stirring (%) [2] | 17 | 21 | 1 |
| Viscosity of preliminary emulsion (Pa · s) | 105 | 110 | 45 |
| Viscosity of fine emulsion (Pa · s) | 186 | 189 | 135 |
| Oil-off ratio of mayonnaise (%) | 0.13 | 0.15 | 0.56 |

[1] Viscosity change ratio (%) = (viscosity after stirring − initial viscosity)/(initial viscosity) × 100
[2] A reduction (%) of egg yolk protein solubility = (initial protein solubility − protein solubility after stirring)/initial protein solubility × 100

The acidic oil-in-water type emulsified compositions of the present invention are excellent in taste, appearance, stability, and texture and are suited for industrial production because they have remarkable resistance against pressure-induced shear upon preparation or use.

The invention claimed is:

1. An acidic oil-in-water type emulsified composition, comprising an oil phase and an aqueous phase, wherein said composition comprises:
   (A) an oil or fat having a diglyceride content of 30 wt. % or greater,
   (B) an egg yolk, and
   (C) a water soluble soybean polysaccharide,
   wherein said water soluble soybean polysaccharide is at least one polysaccharide selected from the group consisting of a water-soluble soybean polysaccharide prepared by subjecting bean-curd refuse which remains after making bean curd to alkali treatment or hydrolysis and a water soluble soybean polysaccharide prepared by subjecting a residue remaining after extraction of protein from soybean to alkali treatment or hydrolysis.

2. The acidic oil-in-water emulsified composition of claim 1, wherein said egg yolk comprises a lysophospholipid and a phospholipid and wherein said lysophospholipid is partially or entirely derived from the egg yolk.

3. The acidic oil-in-water emulsified composition of claims 1 or 2, wherein said egg yolk comprises a lysophospholipid and a phospholipid and wherein the lysophospholipid is partially or entirely derived from an enzyme treated egg yolk.

4. The acidic oil-in-water emulsified composition of claim 3, wherein the weight percentage of the lysophospholipid to the total phospholipid is 15% or greater in terms of a phosphorous amount.

5. The acidic oil-in-water emulsified composition of claim 3, wherein the enzyme is selected from the group consisting of esterases, lipases, phopholipases, and mixtures thereof.

6. The acidic oil-in-water emulsified composition of claim 1, further comprising a phytosterol, phytosterol esters and mixtures thereof.

7. The acidic oil-in-water type emulsified composition of claim 6, wherein said composition comprises a phytosterol in an amount of 1.2 to 10 wt. %.

8. The acidic oil-in-water emulsified composition of claim 1, which is obtained by subjecting an aqueous phase containing the egg yolk to mechanical treatment to heighten the viscosity by at least 50% or reducing the solubility of the egg yolk protein by 5 to 60%, each compared with that before treatment, and then adding an oil phase containing the component (A).

9. The acidic oil-in-water type emulsified composition of claim 1, wherein a fatty acid residue of said diglyceride has 8 to 24 carbon atoms.

10. The acidic oil-in-water type emulsified composition of claim 1, wherein said diglyceride comprises 55 wt. % or more of unsaturated fatty acid residues.

11. The acidic oil-in-water type emulsified composition of claim 1, wherein said diglyceride comprises 70 to 100 wt. % of unsaturated fatty acid residues.

12. The acidic oil-in-water type emulsified composition of claim 1, wherein said oil or fat has a diglyceride content of 35 to 100%.

13. The acidic oil-in-water type emulsified composition of claim 1, wherein said oil or fat has a diglyceride content of 50 to 99.9%.

14. The acidic oil-in-water type emulsified composition of claim 1, wherein said oil or fat has a monoglyceride content is 0 to 5 wt. %.

15. The acidic oil-in-water type emulsified composition of claim 1, wherein said oil or fat has a free fatty acid content is said oil phase is 1 wt. % or less.

16. The acidic oil-in-water type emulsified composition of claim 1, wherein said oil or fat has a triglyceride content is said oil phase is 70 wt. % or less.

17. The acidic oil-in-water type emulsified composition of claim 1, wherein a content of yolk in said composition is from 5 to 20 wt. %.

18. The acidic oil-in-water type emulsified composition of claim 1, wherein said water soluble soybean polysaccharide is comprised of a monosaccharide selected from the group consisting of rhamnose, fucose, arabinose, xylose, galactose, glucose, uronic acid and a mixture thereof.

19. The acidic oil-in-water type emulsified composition of claim 1, wherein said water soluble soybean polysaccharide is prepared by subjecting bean-curd refuse which remains after making bean curd to alkali treatment or hydrolysis.

20. The acidic oil-in-water type emulsified composition of claim 1, wherein said water soluble soybean polysaccharide is prepared by subjecting a residue remaining after extraction of protein from soybean to alkali treatment or hydrolysis.

21. The acidic oil-in-water type emulsified composition of claim 1, wherein said water soluble soybean polysaccharide is present in an amount of 0.01 to 10 wt. %.

22. The acidic oil-in-water type emulsified composition of claim 1, wherein said aqueous phase comprises water.

23. The acidic oil-in-water type emulsified composition of claim 1, wherein said aqueous phase has a pH of from 2 to 6.

24. The acidic oil-in-water type emulsified composition of claim 1, wherein a weight ratio of said oil phase to said aqueous phase ranges form 10/90 to 80/20.

25. The acidic oil-in-water type emulsified composition of claim 1, wherein said composition has a viscosity of 50 kPa s to 500 kPa and a volume average emulsion particle size of from 0.1 μm to 10 μm.

* * * * *